United States Patent [19]

Kiovsky

[11] 4,235,731

[45] Nov. 25, 1980

[54] MODIFIED TERPOLYMER DISPERSANT - VI IMPROVER

[75] Inventor: Thomas E. Kiovsky, Houston, Tex.

[73] Assignee: Shell Oil Company, Houston, Tex.

[21] Appl. No.: 733,575

[22] Filed: Oct. 18, 1976

[51] Int. Cl.$^3$ .............................................. C10M 1/32
[52] U.S. Cl. ......................... 252/51.5 A; 260/326.5 F; 260/326.5 FM; 525/285; 525/379; 525/381
[58] Field of Search .................. 252/51.5 A; 260/326.5 F, 326.5 FM; 525/285, 379, 381

[56] References Cited

U.S. PATENT DOCUMENTS

| | | | |
|---|---|---|---|
| 3,219,666 | 11/1965 | Norman et al. | 252/51.5 A X |
| 3,235,503 | 2/1966 | de Vries | 252/51.5 A |
| 3,329,658 | 7/1967 | Fields | 252/51.5 A X |
| 3,341,542 | 9/1967 | LeSuer et al. | 252/51.5 A X |
| 3,432,479 | 3/1969 | Verdol et al. | 252/51.5 A X |
| 3,438,899 | 4/1969 | Benoit | 252/51.5 A |
| 3,471,458 | 10/1969 | Mehmedbasich | 252/51.5 A X |
| 3,541,012 | 11/1970 | Stuebe | 252/51.5 A |
| 3,620,977 | 11/1971 | Honnen et al. | 252/51.5 A |
| 3,864,270 | 2/1975 | Cullen | 252/51.5 A |
| 3,941,808 | 3/1976 | Pratt | 252/51.5 A X |
| 4,169,063 | 9/1979 | Kiovsky | 252/51.5 A |

*Primary Examiner*—Andrew Metz
*Attorney, Agent, or Firm*—Dean F. Vance

[57] ABSTRACT

Lubricating oil additives having both dispersant and viscosity-index improving properties are prepared by reacting terpolymers of ethylene, a $C_3$ to $C_8$ alpha-olefin, and a non-conjugated diene with maleic anhydride and certain polyamines.

9 Claims, No Drawings

MODIFIED TERPOLYMER DISPERSANT - VI IMPROVER

BACKGROUND OF THE INVENTION

The newer engines place increased demands on the lubricants to be employed. In the past a number of different additives have been added to lubricating oils to improve such properties as viscosity index and dispersancy. Significant reductions in cost can be made by employing a single additive that improves a number of lubricant properties. However, in attempting to improve more than a single lubricant property, care must be taken in not causing the deterioration of other properties. For example, while the modified EPDM polymer additive disclosed in U.S. Pat. No. 3,864,268 may improve both dispersancy and viscosity characteristics over a narrow range, by employing an oxidation step to attach polar groups to the polymer backbone the patentees have reduced lubricant stability by introducing sites for oxidative attack. Likewise, the lubricant additive disclosed in U.S. Pat. No. 3,842,010, lacks a certain amount of oxidative stability due to the employment of an epoxidation step to attach polyamine groups to the polymer backbone. A new lubricant additive having both dispersant and viscosity-index improving properties as well as good oxidative stability has now been found.

SUMMARY OF THE DISCLOSURE

Ashless, oil-soluble additives having both dispersant and viscosity-index (VI) improving properties are prepared by the process comprising:
(a) reacting a terpolymer with maleic anhydride at a temperature of between about 180° C. and 250° C. wherein the terpolymer has a molecular weight of between about 70,000 and 150,000 and wherein the terpolymer comprises about 30 to 85 mole percent ethylene, about 15 to 70 mole percent of a $C_3$ to $C_8$ alpha monoolefin and about 1 to about 20 mole percent of a $C_5$ to $C_{14}$ non-conjugated diene; and
(b) reacting the product of step (a) with a $C_1$ to $C_{18}$ amine containing 1 to 8 nitrogen atoms.

When the polyamine employed is tetraethylene pentamine (TEPA), it has been found in actual engine tests that the polymeric additive not only possesses excellent dispercency and VI improving properties, but also possesses excellent stability.

DETAILED DESCRIPTION OF THE INVENTION

One significant aspect of the present invention is that the terpolymer employed as the starting material need not be of the ultimate desired molecular weight range of 70,000 to 150,000. If desired, terpolymers having molecular weights of 150,000 to 1,000,000 may also be employed. As part of the present invention, the derivatized terpolymer of higher than desird molecular weight may be subjected to a shearing process as hereinafter described to reduce the molecular weight and improve molecular weight distribution to the desired range.

The terpolymers employed in the instant invention are well known. For example, ethylene-propylene-non-conjugated diolefin terpolymers are well known articles of commerce. The preparation of typical terpolymers, using Ziegler-Natta catalysts, is described for example in U.S. Pat. Nos. 2,933,480; 3,000,866; and 3,093,621. These terpolymers, which are primarily produced for use in elastomeric compositions, are characterized by the absence of chain or backbone unsaturation and contain sites of unsaturation in groups which are pendant to or are in cyclic structures outside of the main polymer chain. These structures render the polymers particularly resistant to breakdown by atmospheric oxidation or ozone.

Useful terpolymers for the production of the derivatized products of this invention comprise ethylene, a $C_3$ to $C_8$ straight or branched chain alpha-olefin and a non-conjugated diene. Representative non-limiting examples of non-conjugated dienes that may be used as the third monomer in the terpolymer include:

(a) Straight chain acyclic dienes such as: 1,4-hexadiene; 1,5-heptadiene, 1,6-octadiene.

(b) Branched chain acyclic dienes such as: 5-methyl-1, 4-hexadiene; 3,7-dimethyl 1,6-octadiene; 3,7-dimethyl 1,7-octadiene; and the mixed isomers of dihydro-myrcene and dihydrocimene.

(c) Single ring alicyclic dienes such as: 1,4-cyclohexadiene; 1,5-cyclooctadiene; 1,5-cyclododecadiene, 4-vinyl-cyclohexene; 1-allyl,4-isopropylidene cyclohexane; 3-allyl-cyclopentene; 4-allyl cyclohexene and 1-isopropenyl 4-(4-butenyl) cyclohexane.

(d) Multi single ring alicyclic dienes such as: 4,4'-dicyclopentenyl and 4,4'-dicyclohexenyl dienes.

(e) Multi-ring alicyclic fused and bridged ring dienes such as: tetrahydroindene; methyl tetrahydroindene; dicyclopentadiene; bicyclo(2.2.1) hepta 2,5-diene; alkenyl, alkylidene, cycloalkenyl and cycloalkylidene norbornenes such as: 5-methylene-6-methyl-2-norbornene; 5-methylene-6,6-dimethyl-2-norbornene; 5-propenyl-2-norbornene; 5-(3-cyclopentenyl)-2-norbonene and 5-cyclohexyldene-2-norbornene.

In general useful terpolymers contain non-conjugated dienes having 5 to 14 carbon atoms and exhibit weight average molecular weights of from 70,000 to 1,000,000 e.g., 70,000 to 150,000. Preferred dienes include ethylidene norbornene, dicyclopentadiene and 1,4 hexadiene.

Structurally, the terpolymers suitable for conversion to the succinimides and their functional adducts of the present invention may be illustrated for various non-conjugated diene monomers as random terpolymers in which the following moieties are linked in the polymer chain in a random sequence and in a varying number.

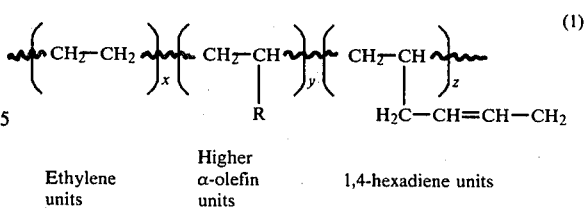

Ethylene units; Higher α-olefin units; 1,4-hexadiene units (1)

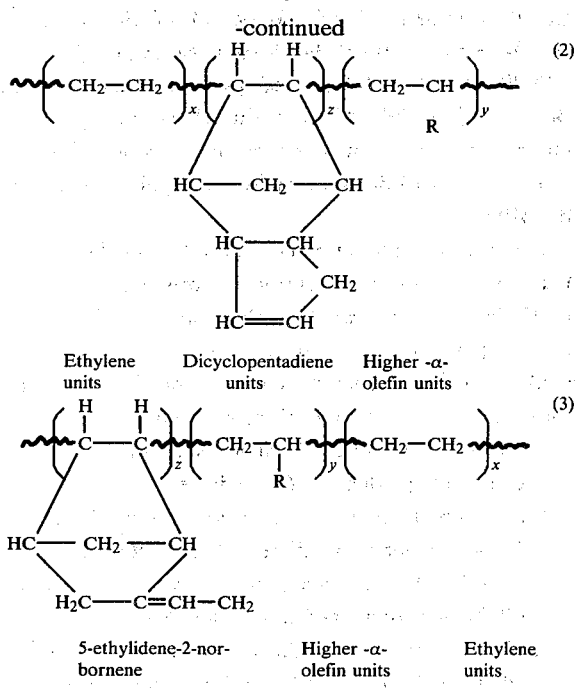

in which x, y and z are cardinal numbers. While these terpolymers are essentially amorphous in character by superficial inspection, they may contain up to about 25 percent by weight of crystalline segments as determined by X-ray or differential scanning calorimetry. Details of these methods for measurement of crystallinity are found in J. Polymer Science, A-2, 9, 127 (1971) by G. Ver Strate and Z. W. Wilchinsky.

Terpolymers, useful in the present invention contain at least 30 mol. percent, preferably not more than 85 mol. percent of ethylene; between about 15 and about 70 mol. percent of a higher alphaolefin or mixture thereof, preferably propylene; and between 1 and 20 mol. percent, preferably 1 to 15 mol. percent, of a nonconjugated diene or mixture thereof. Especially preferred are polymers of about 40 to 70 mol. percent ethylene, 20 to 58 mol. percent higher monoolefin and 2 to 10 mol. percent diene. On a weight basis, usually the diene will be at least 2 or 3 wt. percent of the total terpolymer.

The terpolymer is first reacted with maleic anhydride in the presence of a solvent. The maleic anhydride reacts with the double bonds available on the diene portion of the terpolymer. Usually, about 10 to 100%, preferably 50 to 95% of the double bonds in the terpolymer are converted to succinic anhydride groups. Since it is uneconomical for practical purposes to attempt to convert all of the double bonds in the terpolymer molecule to anhydride groups, the structure of the resulting maleated polymer will typically contain some unreacted double bonds.

Various solvents may be employed in the maleation step including generally olefin-free petroleum hydrocarbons, aromatics and halogenated hydrocarbons. A preferred solvent is a lubricating oil basestock. Another useful solvent is trichlorobenzene. Preferably, a concentration in the range of about 1 to 10 percent by weight of terpolymer in solvent may conveniently be used for maleation.

An excess of maleic anhydride over that stoichiometrically necessary to react with all the double bonds present in the diene portion of the terpolymer is typically employed. Preferably, at least one mole of maleic anhydride is used for each mole of diene monomer present in the terpolymer, with molar ratios of maleic anhydride to diene of between about 1:1 and 2:1 being particularly suitable. Less than stoichiometric amounts of maleic anhydride may also be used.

The maleation may occur with or without the use of catalyst or radical initiators such as tertiary hydroperoxide. During thermal reaction, the temperature is typically maintained between about 180° and 250° C. for between about 1 hour and about 10 hours. Typical conditions are about 225° C. for about 4 hours. Any excess maleic anhydride is typically removed by either vacuum distillation or through the use of a stripping gas stream.

In a preferred embodiment, the maleation takes place in the presence of chlorine. Chlorination has been disclosed with polymers of isobutene in U.S. Pat. No. 949,981. The molar amount of chlorine used is preferably such that the mixture of polymer and maleic anhydride is contacted with from 0.3 to 1.5, more preferably from 0.5 to 1.2 moles of chlorine for each mole of maleic anhydride. Insofar as the conversion of the polymer is concerned there appears to be no lower limit on the amount of chlorine which may be used. In practice, however, it is preferred to remain within the aforesaid ranges.

Suitably the mixture of polymer and maleic anhydride is heated to the reaction temperature before it is contacted with the chlorine. The mixture is contacted with a molar deficiency of chlorine before any substantial amount, e.g. less than half, of the maleic anhydride has reacted. Suitably, substantially none of the maleic anhydride has reacted. The rate of introduction of chlorine into the mixture may vary between wide limits but is preferably such that it equals the rate of chlorine uptake. Usually the chlorine is introduced over a period of from 0.5 to 10 hours, preferably of from 3 to 7 hours, at a temperature of between about ambient to 100° C.

After the chlorinatiion treatment it is advantageous to subject the resultant product mixture to a post-reaction or thermal treatment. This thermal treatment is suitably carried out at a temperature in the range of from 140° to 220° C., preferably from 160° to 210° C. The conditions are usually such, e.g. reflux conditions, that substantially no part of the product mixture is removed during this thermal treatment. The thermal treatment may be for 0.1 to 20 hours,but is preferably from 0.5 to 10 hours. Longer periods tend to increase the formation of tarry by-products.

The maleated polymer is then reacted with a polyamine to form the oil-soluble product of the instant invention.

The $C_1$ to $C_{18}$ amines employed in the instant invention can be branched or unbranched, saturated, aliphatic, primary or secondary amines, containing 1 to 8 nitrogens, preferably mono or diamines, such as ethyl amine, butylamine, sec. butylamine, diethylamine, etc., but including higher polyamines such as alkylene polyamines, wherein pairs of nitrogen atoms are joined by alkylene groups of 2 to 4 carbon atoms. Thus, polyamines of the formula:

$NH_2(CH_2)_n-[NH(CH_2)_n]_m-NH_2$ are included where n is 2 to 4 and m is 0 to 6. Examples of such polyamines include tetraethylene pentamine, tripropylene tetramine, N-aminoalkyl piperazines, e.g., N-(2-aminoethyl) piperazine, N,N'-di(2-aminoethyl) piperazine, etc. Preferred is tetraethylene pentamine, as well as corresponding commercial mixtures such as "Polyamine H", and "Polyamine 500".

The molar ratio of polyamine to diene portion of the terpolymer is typically between about 0.1:1 and about 2:1, preferably between about 0.5 and about 2:1, most preferably about 1:1. The conditions during amidization are typically about 150° to 250° C. for between about 1 hour and 5 hours, e.g. about 1 hour at 160° C. followed by 1 hour at 190° C.

In both the amidization and maleation steps it is much preferred that the reactions take place in the absence of oxygen. A nitrogen blanket is often used to accomplish this result. The reason for performing the reaction in the absence of oxygen is that the resulting additive may be more oxidatively unstable if any oxygen is present during the formation of the additive.

If excess polyamine is employed, then it may be desirable to remove the excess. One means of doing this is to first add a volume of heptane equal to the volume of dissolved additive. Then an equal volume of methanol is added. Two separate layers are therein formed; a bottom layer comprising predominantely methanol and the unreacted polyamine and a top layer comprising predominantely heptane, the solvent and the additive product. After separating the bottom layer, the volatiles present in the top layer can then be removed by a distillation technique.

If the terpolymer originally employed had a sufficiently low molecular weight, e.g. between about 70,000 and about 150,000, then the final additive product should have sufficient viscosity-index improving properties. However, as stated above, it is possible to prepare the instant additive product starting with a terpolymer having a high molecular weight between about 200,000 and about 1,000,000. When employing the higher molecular weight terpolymer, it is necessary to subject the resulting higher molecular weight additive product to a shearing condition in order to reduce the molecular weight of the additive to the desired molecular weight. One shearing mechanism involves adding a solvent such as heptane to the additive product in order to reduce the viscosity, and then pumping the solution through a Diesel injecton nozzle at high pressures, such as above about 1000 psig. Other high shear devices include high shear mixers and pumps such as a gear pump. The molecular weight of the resulting polymer can be controlled by varying the number of times that the solution is pumped through the nozzle or high shear device. In addition to reducing the molecular weight of the additive product to within the desired range, shearing also narrows the molecular weight distribution since bigger molecules are sheared more readily than smaller molecules. This narrower molecular weight distribution is advantageous since it results in greater stability in the engine. It is preferred that the ratio of $M_w/M_n$ be between about 1 and about 4 where $M_w$ is the weight average molecular weight and $M_n$ is the number average molecular weight.

The reaction product of this invention can be incorporated in lubricating oil compositions, e.g., automotive crankcase oils, in concentrations within the range of about 0.1 to about 15, preferably about 0.1 to 3, weight percent based on the weight of the total compositions. The lubricating oils to which the additives of the invention can be added include not only mineral lubricating oils, but synthetic oils also. Synthetic hydrocarbon lubricating oils may also be employed, as well as non-hydrocarbon synthetic oils including dibasic acid esters such as di-2-ethyl hexyl sebacate, carbonate esters, phosphate esters, halogenated hydrocarbons, polysilicones, polyglycols, glycol esters such as $C_{13}$ oxo acid diesters of tetraethylene glycol, etc. When used in gasoline or fuel oil, e.g., Diesel fuel, No. 2 fuel oil, etc., then usually about 0.001 to 0.5 wt. percent, based on the weight of the total composition of the reaction product will be used. Concentrates comprising a minor proportion, e.g., 10 to 45 wt. percent, of said reaction product in a major amount of hydrocarbon diluent, e.g., 95 to 55 wt. percent mineral lubricating oil, with or without other additives present, can also be prepared for ease of handling.

In the above compositions of concentrates, other conventional additives may also be present, including dyes, pour point depressants, antiwear agents, e.g., tricresyl phosphate, zinc dialkyl dithiophosphates of 3 to 8 carbon atoms, antioxidants such as phenyl-alpha-naphthylamine, tert. octylphenol sulfide, bis-phenols such as 4,4'-methylene bis(3,6-di-tert. butylphenol), viscosity index improvers such as the ethylene-higher olefin copolymer, polymethylacrylates, polyisobutylene, alkyl fumarate-vinyl acetate copolymers, and the like as well as other ashless dispersants or detergents such as overbased sulfonates.

The invention is further illustrated by means of the following illustrative embodiments, which are given for the purpose of illustration alone and are not meant to limit the invention to the particular reactants and amounts disclosed.

ILLUSTRATIVE EMBODIMENT I

In illustrative Embodiment I various terpolymers are employed to form ashless dispersants and VI improvers for lubricating oils. In all cases the higher alpha-olefin component of the terpolymer was propylene and the polyamine employed was tetraethylene pentamine (TEPA).

The characteristics of the various terpolymers employed as the starting materials are listed below in Table I:

TABLE I

| Terpolymer | Tradename | Diene Type | Approx. % Ethylene | Approx. % Propylene | % Diene | Approx. Wt. Avg. Molecular Weight |
|---|---|---|---|---|---|---|
| A | EPsyn 40 | ENB[1] | 49 | 49 | 2.6 | 200,000 |
| B | EPsyn 40A | ENB | 48 | 48 | 4.3 | 200,000 |
| C | EPsyn 55 | ENB | 46 | 46 | 7.7 | 200,000 |
| D | EPsyn 3506 | DCPD[2] | 48 | 48 | 4.7 | 200,000 |
| E | EPsyn 4506 | ENB | 48 | 48 | 4.3 | 200,000 |
| F | EPcar 545 | ENB | 48 | 48 | 3.8 | 230,000 |
| G | Ortholeum | 1,4-hexa- | 48 | 48 | 5.0 | 230,000 |

TABLE I-continued

| Terpolymer | Tradename | Diene Type | Approx. % Ethylene | Approx. % Propylene | % Diene | Approx. Wt. Avg. Molecular Weight |
|---|---|---|---|---|---|---|
| | 2052 | diene | | | | |

[1] Ethylidene norbornene
[2] Dicyclopentadiene

In each run, the terpolymer was dissolved in a standard HVI 100 Neutral lubricating oil base stock resulting in a 5 to 10% weight solution. Then an approximately two-fold excess of maleic anhydride was added to the solution, i.e., the stoichiometric amount of maleic anhydride theoretically necessary to react with all the double bonds available on the diene portion of the terpolymer was doubled. The maleation step was carried out by heating the reactants at 225° C. for four hours under a nitrogen blanket in the absence of any added catalyst. Any unreacted maleic anhydride was removed by vacuum distillation at about 200° C.

After removal of the excess maleic anhydride, at least ½ of the stoichiometric amount of polyamine was added, based on the diene content of the terpolymer. Amidization was carried out for one hour at 160° C. and one hour at 190° C. under a nitrogen blanket.

The oil solution of the product was then diluted with an equal volume of heptane. In runs 1 and 11 the solution was then pumped through a Diesel injection nozzle, such as the kind employed in large Diesel truck, several times in order to reduce the molecular weight and narrow the molecular weight distribution. (In run 12 the rubber was sheared before maleation and amidization.)

The product solution was then washed with a volume of methanol equal to the volume of heptane employed. The heptane-oil-additive product layer was then separated. Then the volatiles (mainly heptane and methanol) were vacuum distilled at about 150° C.

The resulting additive product was then further diluted with sufficient 100 HVI oil to give a 2% by weight polymer in oil lubricating composition.

Effectiveness as a sludge dispersant was assessed by means of three commonly used bench tests: a carbon black dispersancy test (CBT) in which the minimum amount of dispersant required to keep carbon black dispersed in oil is determined, a Spot Dispersancy Test (SDT) in which one measures the ability of given concentration of dispersant to facilitate movement of suspended sludge on blotter paper, and the General Motors Oxidation Test (GMOT), in which one measures the ability of the dispersant to reduce the rate of formaton of sludge when air is passed through the hot oil-dispersant solution.

Stability for 100 hours can be considered a good result. In the Spot Dispersancy Test, one part of a 2% weight polymer solution in 100 N oil is mixed with two parts used VC oil and heated overnight at 150° C. Blotter spots are then made on filter paper and the ratio of sludge spot diameter to oil spot diameter is measured after 24 hours. A poor value is under about 50% and a good value is 60% or greater.

In the carbon black dispersancy test the minimum amount of dispersant required to keep a constant amount of black dispersed in base stock when the mixture is heated at 250° C. for 15 minutes is determined. A good value is 0.001% and a poor value is 0.035%.

The amount of the various reactants and the results of the bench scale tests are presented below in Table II.

TABLE II

| | Reactants | | Maleic Anhydride | Tests | | | |
|---|---|---|---|---|---|---|---|
| | Terpolymer | | | | | | |
| Run No. | Type | Grams | grams | TEPA, grams | SDT, % | CBT, % w | GMOT, |
| 1 | B | 500 | 42 | 80 | 75 | | |
| 2 | B | 10 | 0.7 | 1.1 | 73 | | |
| 3 | A | 10 | 0.35 | 0.6 | 70 | | |
| 4 | E | 11 | 0.55 | 1.1 | 72 | | |
| 5 | D | 10 | 0.7 | 1.7 | 74 | | |
| 6 | F | 10 | 0.7 | 1.7 | 72 | | |
| 7 | G | 6 | 0.7 | 1.3 | 85 | | |
| 8 | A | 5 | 0.23 | 0.47 | 51 | 0.005 | |
| 9 | C | 5 | 0.68 | 1.25 | 72 | 0.001 | |
| 10 | D | 10 | 0.76 | 1.7 | 68 | 0.002 | No sludge deposits. Good spot after 150 hours. Less than 1% pentane insoluble. |
| 11 | E | 10 | 0.73 | 1.5 | 78 | | |
| 12 | A | 11 | 0.55 | 1.1 | 72 | | |
| 13 | B | 10 | 0.70 | 0.31 | 70 | | |

ILLUSTRATIVE EMBODIMENT II

In Illustrative Embodiment II, a sequence V-C Engine Test was performed employing the oil-soluble product designated Run No. 1 in Illustrative Embodiment I. The V-C Engine Test is an ASTM test procedure designated to evaluate the sludge and varnish forming tendencies of motor oils. The oil formulation employed in the test comprised 35 parts by weight of the oil-soluble product of Run No. 1 (IEI), 45.5 parts by weight of a 250 neutral high viscosity index lubricating oil, 16.4 parts by weight of a 100 neutral high viscosity index lubricating oil, and a typical dispersant inhibitor package. No additional dispersants or VI improvers were added. The resulting oil formulation had a $V_K$ at 210° F. of about 21 centistokes and a 0° F. viscosity of about 21 poise. The results of the test are presented below in Table III along with the minimum SE service classification.

TABLE III

| Performance Criteria | Minimum Pass for SE Quality | Test Result |
| --- | --- | --- |
| Average sludge, min. | 8.5 | 9.32 |
| Piston skirt varnish, min. | 7.9 | 7.79 |
| Average varnish, min | 8.0 | 8.48 |

ILLUSTRATIVE EMBODIMENT III

Illustrative Embodiment III indicates the effect of shearing on molecular weight distribution. The starting terpolymer was EPsyn 4506 and had a weight average molecular weight of about 195,000. The Q value of the starting terpolymer ($Q=M_w/M_n$) was about 3.15. This terpolymer was sheared by being passed through a Diesel injection nozzle a number of times. The final terpolymer had a molecular weight of about 90,000 and a Q value of about 1.43. This embodiment illustrates that shearing according to the present invention not only reduces molecular weight to the desired range, but also has an excellent effect on molecular weight distribution.

ILLUSTRATIVE EMBODIMENT IV

In Illustrative Embodiment IV 10 grams of Ortholeum 2052 EPDM rubber in an HVI 100 neutral lubricating oil base stock solution was contacted first with 465 milligrams of chlorine at 50° C. for 30 minutes. Ortholeum 2052 has about 4% 1,4-hexadiene, 48% ethylene, and 48% propylene units. The chlorinated rubber was then contacted with 1.3 grams maleic anhydride at 180° C. for two hours under a nitrogen blanket in the absence of any added catalyst. Any unreacted maleic anhydride was removed by vacuum distillation. Next, about 0.58 grams dimethylaminopropylamine was added. The product was recovered as in Illustrative Embodiment I and was then diluted with sufficient 100 HVI oil to give a 2% by weight polymer in oil lubricating composition. The Spot Dispersancy Test result was 73%.

ILLUSTRATIVE EMBODIMENT V

Illustrative Embodiment V shows the effect of varying the ratio of polyamine to diene. The terpolymer employed was EPsyn 40 A. For each run, 10 grams of terpolymer was first chlorinated and then reacted with 0.8 grams of maleic anhydride. Then the maleated terpolymer was reacted with varying amounts of TEPA. The amounts of TEPA employed and the test results are presented below in Table IV.

TABLE IV

| Run No. | TEPA, grams | Molar Ratio of TEPA to Diene Monomer | SDT, % |
| --- | --- | --- | --- |
| 1 | 0.31 | 0.5:1 | 67 |
| 2 | 0.62 | 1:1 | 63 |
| 3 | 0.94 | 1.5:1 | 67 |
| 4 | 1.25 | 2:1 | 67 |

What is claimed is:

1. The oil-soluble product prepared by the process comprising:
   (a) reacting a terpolymer with maleic anhydride in the presence of a solvent and at a temperature of between about 180° C. and 250° C. wherein the terpolymer has a molecular weight of between about 200,000 and 1,000,000 and comprises about 30 to 85 mole percent ethylene, about 15 to 70 mole percent of a $C_3$ to $C_8$ alpha monoolefin and about 1 to about 20 mole percent of a $C_5$ to $C_{14}$ non-conjugated diene;
   (b) reacting the product of step (c) with an amine having the formula:

$N_2(CH_2)_{\overline{n}}[NH(CH_2)_n]_{\overline{m}}NH_2$ where n is 2 to 4 and m is 0 to 6; and
   (c) subjecting the product of step (d) to a repeated shearing action so as to reduce the molecular weight of the oil-soluble product to between about 70,000 and 150,000, and the ratio of Mw/Mn to between 1 and 4.

2. The composition of claim 1 wherein said terpolymer and maleic anhydride are reacted in the presence of a solvent in a molar ratio of maleic anhydride to the diene portion of the terpolymer of between about 1:1 and about 2:1.

3. The composition of claim 2 wherein said terpolymer and maleic anhydride are reacted in the presence of a solvent and chlorine in a molar ratio of chlorine to maleic anhydride of between about 0.3:1 and 1.5:1.

4. The composition of claim 1 wherein the diene is ethylidene norbornene and the $C_3$ to $C_8$ alpha monoolefin is propylene.

5. The composition of claim 4 wherein the amine is tetraethylene pentamine.

6. A lubricating composition comprising a major amount of a lubricating oil and from about 0.1 to about 15.0 weight percent of the oil-soluble product of claim 1.

7. A lubricating composition comprising a major amount of a lubricating oil and from 0.1 to about 15.0 weight percent of the oil-soluble product of claim 5.

8. The composition of claim 1 wherein the molar ratio of amine to the diene portion of the terpolymer is between about 0.1:1 and about 2:1.

9. A lubricating oil concentrate comprising a major amount of a lubricating oil and from 10 to 45 weight percent of the oil soluble product of claim 1.

* * * * *